United States Patent Office 3,391,921
Patented July 9, 1968

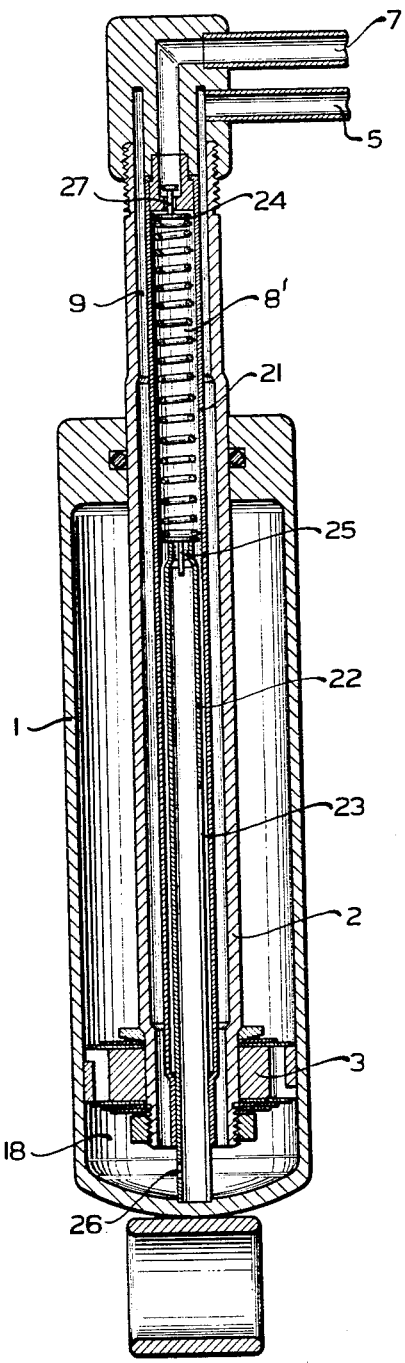

3,391,921
HYDROPNEUMATIC SUSPENSION DEVICE
Ludwig Axthammer, Schweinfurt, Germany, assignor to Fichtel & Sachs A.G., Schweinfurt, Germany
Filed Nov. 22, 1966, Ser. No. 596,164
Claims priority, application Germany, Dec. 17, 1965, F 47,947
9 Claims. (Cl. 267—64)

This invention relates to vehicle suspensions, particularly to suspension devices for automotive vehicles, and more specifically to hydropneumatic suspension devices which act as springs and shock absorbers, and also automatically maintain a suspended vehicle body at a normal level if the vehicle load increases or decreases.

Known hydropneumatic suspension units are either relatively bulky or relatively complex in their design, and correspondingly difficult to install.

A primary object of the invention is the provision of a suspension device of the type described which is very compact so as to fit into a restricted space sufficient only to accommodate conventional shock absorbers, and which is thus capable of being installed without difficulty in existing vehicles.

Another object is the provision of a compact hydropneumatic suspension device which is simple in its construction and reliable in its operation.

The suspension device of the invention consists of a suspension unit proper whose outer elements are a cylinder and a piston rod adapted to be fastened respectively to the sprung and unsprung mass of the vehicle, the piston rod moving axially inward and outward of the cylinder cavity in the usual manner. A piston mounted on the piston rod axially separates two compartments in the cylinder cavity and is formed with damping passages which provide restricted communication between the compartments when the piston moves in the cylinder in either axial direction.

A storage chamber and an expansion chamber are arranged outside the suspension unit proper and are each equipped with means for keeping a liquid in the chamber under a pressure higher than atmospheric pressure, the operating pressure in the expansion chamber being normally lower than that in the storage chamber. A first conduit connects the storage chamber to one of the compartments in the cylinder, and a second conduit permanently connects the expansion chamber to the compartment.

A pump is provided within the unit for pumping liquid from the afore-mentioned compartment through the first conduit into the storage chamber, and a valve is arranged in the unit to admit liquid from the storage chamber to the compartment by opening the first conduit.

A valve control arrangement within the unit causes the valve to open the first conduit in response to a first relative axial position of the cylinder and piston rod. A pump control arrangement within the unit causes the pump to return liquid from the compartment to the storage chamber in response to the relative reciprocating movement of the piston rod and cylinder about a second relative axial position.

Other features, additional objects, and many of the attendant advantages of this invention will be readily appreciated as the same becomes better understood by reference to the following description of preferred embodiments when considered with reference to the attached drawing in which:

FIGURE 2 shows a modified device of the invention in a view corresponding to that of FIGURE 1.

Figure 1:
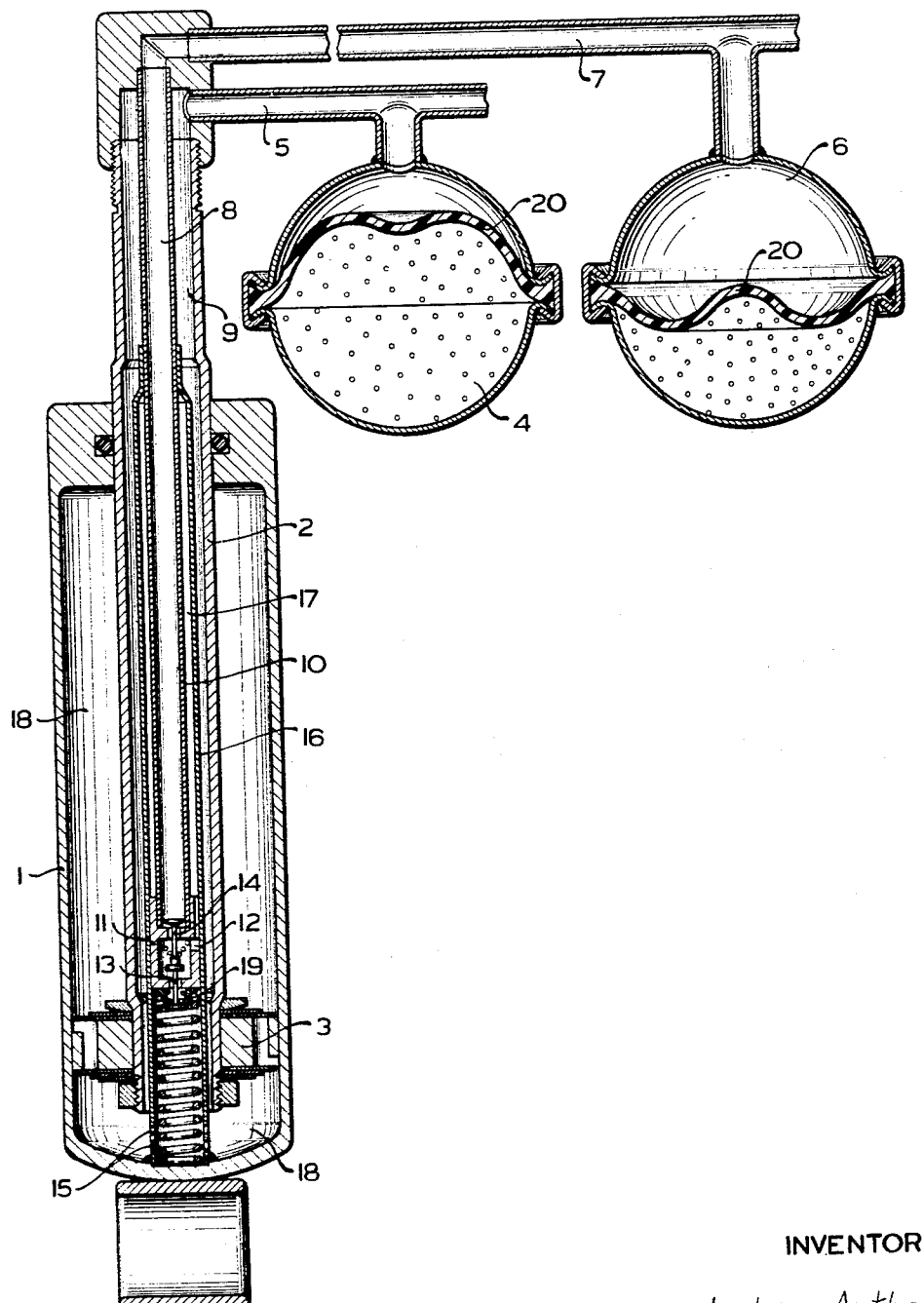
FIGURE 1 shows a suspension device of the invention in elevational section.

Referring now to the drawing in detail, and initially to FIGURE 1, there is seen a hydropneumatic suspension unit having a cylinder 1, a tubular piston rod 2 coaxially movable inward and outward of the cylinder 1 in sealing engagement, and a damping piston 3 fixedly mounted on the rod 2 in the cylinder 1. Two groups of axial passages 3a in the piston 3 are equipped with annular valve flaps 3b, 3c which close one group of passages 3a during movement of the piston in one axial direction while closing the other group, and this relationship is reversed in a known manner when the piston 3 moves in the opposite axial direction through the liquid normally filling the entire unit.

The cylinder 1 is normally attached to an unsprung axle of a vehicle by a ring 1a, and a head 2a on the end of the piston rod 2 outside of the cylinder 1 similarly permits the piston rod to be attached to a vehicle body in a conventional manner, not shown in detail. An expansion chamber 4 and a storage chamber 6 are connected to respective coaxial conduits in the head 2a by conduits 5, 7 which are sufficiently long and flexible to permit the chambers 4, 6 to be mounted on the vehicle body in any convenient location remote from the suspension unit proper.

The tubes 10, 16 are coaxially arranged within the rod 2. The tube 10 is fastened to the head 2a, and the upper end of its bore 8 communicates with the conduit 7. Its lower end carries a hollow pumping piston 11 which is axially slidable in the tube 16 in sealing engagement. An axial passage through the piston 11 is provided with two mushroom valves 13, 14 arranged in tandem whose heads are spring-biased in a downward direction to close respective terminal orifices of the passage. The stem of the valve 14 is axially spaced from the head of the valve 13 when both valves are in their non-illustrated closing positons. The stem of the valve 13 projects downward from the piston 11 in all operative positions of the valve.

The lower end of the tube 16 is attached to the bottom of the cylinder 1, and its reduced upper end sealingly engages the tube 10. The tube 16 radially separates a pumping space 17 of annular cross section above the pumping piston 11 adjacent the tube 10 from a duct 9, also of annular cross section, which is bounded in an outward radial direction by the piston rod 2, communicates with the conduit 5 through the head 2a, and is downwardly open to the bottom compartment 18 of the cylinder 1 under the damping piston 3.

A duct 12 in the piston 11 connects the hollow interior of the latter between the afore-mentioned orifices with the pumping space 17. A radial bore 15 near the bottom end of the tube 16 connects the bottom compartment 18 with the axial cavity of the tube 16 under the piston 11. A helical compression spring 19a coaxially mounted within this cavity on the bottom of the cylinder 1 carries an abutment 19 which engages the stem of the valve 13 in the illustrated condition of the apparatus, and lifts the valves 13, 14 from the orifices in the piston 11 against the restraint of their biasing springs.

The chambers 4, 6 are each divided into two parts by a pliable membrane 20. One of the parts communicates with an associated conduit 5, 7 and is normally filled with liquid, while the other part is sealed and filled with a gas under pressure, the gas pressure in the storage chamber 6 being higher than in the expansion chamber 4.

The liquid-filled part of the expansion chamber 4 thus permanently communicates through the duct 9 with the bottom compartment 18 of the cylinder 1 and with the cavity in the tube 16 below the pumping piston 11. It further communicates with the top compartment 18' in the cylinder 1 through the passages 3a whenever the damping piston 3 moves in the cylinder 1, and it is connected with the bore 8, the pumping space 17, and the storage chamber 6 whenever the valves 13, 14 are in the illustrated position.

The afore-described apparatus operates as follows:

When the load on the non-illustrated vehicle is increased, the piston rod 2, the piston 3, the tube 10, and the piston 11 move inward of the cylinder 1 and of the tube 16 from a non-illustrated normal position into the illustrated position in which the valves 13, 14 are opened by the spring-mounted abutment 19 so that liquid under the high pressure of the gas cushion in the storage chamber 6 is admitted through the bore 8 into the cylinder compartments 18, 18', and from there through the duct 9 into the expansion chamber 4 whose gas cushion is thereby compressed.

When the prevailing pressure in the cylinder compartments 18, 18' is sufficiently increased by the admitted liquid, the piston rod 2 and the elements fastened thereto are driven axially outward until the biasing springs of the valves 13, 14 balance the spring 19a in a position in which the valve 14 closes the upper orifice of the piston 11 under the pressure of the gas cushion in the storage chamber 6 and the force of its biasing spring, while the head of the valve 13 abuts against the stem of the valve 14, thereby keeping the lower orifice of the piston 11 open and providing continuous communication between the compartments 18, 18' and the pumping space 17. Liquid flows inward and outward through the duct 12 during piston rod movement.

This position of the valves 13, 14 is maintained during the normal oscillating movements of the piston rod 2 while the vehicle travels. The unit operates merely as a pneumatic spring relying on the resilience of the gas cushion in the expansion chamber 4, and as a shock absorber due to the damping action of the piston 3.

When the load on the vehicle is reduced to the extent that the gas cushion in the expansion chamber 4 can drive the piston rod 2 outward from the normal position, and the spring 19a releases the valve 13, the tube 16, the piston 11, and the valves 13, 14 cooperate as a conventional reciprocating pump during oscillating movement of the piston rod 2. During inward movement of the piston rod, the pumping space 17 expands, the valve 13 opens in the manner of a suction valve and admits liquid from the compartments 18, 18' into the pumping cylinder constituted by the tube 16. During the outward stroke of the piston rod 2, the suction valve 13 is closed, and liquid is expelled from the contracting pumping space 17 through the valve 14, which functions as a pressure valve, into the storage chamber 4. When a sufficient amount of liquid has been pumped from the cylinder 1 into the storage chamber 4 to lower the vehicle to its normal level, the afore-described normal mode of operation is restored.

The embodiment of the invention shown in FIGURE 2 differs from that illustrated in FIGURE 1 mainly by a reversal in the mounting of the pumping elements and by corresponding changes in the valving. The cylinder 1, piston rod 2, piston 3 are identical with the corresponding elements in FIGURE 1, and the head of the piston rod is connected with non-illustrated expansion and storage chambers by conduits 5, 7 in the manner described above.

A tube 21 is coaxially mounted in the piston rod 2, and a tube 22 is coaxially mounted on the bottom of the cylinder 1 and extends into the tube 21. The upper end of the bore 8' in the tube 21 communicates with the non-illustrated storage chamber, identical with the chamber 6 in FIGURE 1, through the conduit 7 when a valve 27 at the orifice of the conduit in the bore 8' is open. The lower end of the tube 21 is of reduced cross section and is slidably sealed to the tube 22 except for an axial groove 23 along the lower half of the tube 22 which provides communication between the bore 8' and the compartment 18 in the cylinder 1. The conduit 5, which leads to the non-illustrated expansion chamber, identical with the chamber 4 shown in FIGURE 1, communicates with the compartment 18 through an open duct 9 of annular cross-section which mainly extends between the inner wall of the piston rod 2 and the tube 21.

The lower end of the tube 22 is connected to the compartment 18 by a radial bore 26. The axial orifice at the top of the tube 22 is provided with a check valve 25. A helical compression spring 24 attached to the valve 25 extends upward therefrom and abuttingly engages the valve 27 on the conduit 7 in the illustrated position of the apparatus, thereby opening the valve 27.

When the valve 25 is closed, the tube 22 constitutes a plunger which moves inward and outward of a pumping cylinder constituted by the bore 8' of the tube 21 when the piston rod 2 reciprocates axially relative to the cylinder 1. The pump is inoperative as long as the groove 23 extends from the compartment 18 axially inward into the bore 8.

In the illustrated position, the suspension unit is heavily loaded, and the valve 27 admits supplemental liquid from the storage chamber through the conduit 7 and the groove 23 to the compartment 18. The liquid partly flows through the duct 9 into the expansion chamber to compress the gas cushion therein, and drives the piston rod 2 outward of the cylinder 1, whereby the pressure of the spring 24 on the valve 27 is reduced, and the flow of further liquid into the cylinder 1 is ultimately interrupted by the closing of the valve 27.

In the normal operating condition of the unit, liquid flows back and forth between the chamber 18 and the expansion chamber through the duct 9 while the piston rod 2 oscillates. Liquid also can flow between the pumping space in the bore 8' and the compartment 18 through the groove 23. The valve 27 remains closed, and the valve 25 may open and close in the rhythm of piston rod oscillation.

When the load on the unit is reduced, the piston rod 2 is driven from the cylinder 1 until the seal between the tubes 21, 22 is located above the upper end of the groove 23 so that the pumping space can communicate with the compartment 18 only through the valve 25. Oscillating movement of the piston rod 2 relative to the cylinder 1 under these conditions causes liquid to be drawn into the pumping space or bore 8' through the suction valve 25 during the outward stroke of the piston rod, and discharge of the liquid toward the storage chamber through the valve 27 during the inward stroke of the piston rod 2. Pumping stops automatically when the normal condition described above is restored.

The hydropneumatic, self-leveling, and shock-absorbing suspension units of the invention described above are not more bulky than conventional shock absorbers for vehicles of equal weight. They may therefore be installed in existing vehicles to replace the shock absorbers originally installed. When the vehicle is provided with helical springs, the suspension units of the invention may be installed coaxially within the springs to supplement the effect of the same. The sensitive elements of the unit, namely the pumping mechanism and the automatically operated valves which control the leveling effect, are mounted within the hollow piston rod, and are therefore well protected against damage. The units are of simple construction and have been found highly reliable in their operation.

Obviously, many modifications and variations of the present invention are possible in the light of the above teachings. It is therefore to be understood that, within the scope of the appended claims, the invention may be practiced otherwise than as specifically described.

What is claimed is:

1. A hydropneumatic suspension device comprising, in combination:
   (a) a cylinder member having an axis and defining a cavity therein;
   (b) a piston rod member movably mounted on said cylinder member for axial movement inward and outward of said cavity in sealing engagement with said cylinder member, said members constituting the outer elements of a suspension unit;

(c) fastening means for securing said members respectively to sprung and unsprung masses;
(d) piston means mounted on said piston rod member in said cavity,
  (1) said piston means axially separating two compartments in said cavity and being formed with passage means for providing restricted communication between said compartments during axial movement of said members relative to each other;
(e) a storage chamber including means for maintaining a fluid in said chamber under a predetermined pressure,
  (1) said storage chamber being outwardly spaced from said unit;
(f) means defining an elongated first conduit from said chamber to one of said compartments;
(g) pump means arranged within said unit for pumping fluid from said one compartment through said conduit to said storage chamber;
(h) valve means in said unit for closing and opening said conduit and for thereby admitting fluid from said chamber under said predetermined pressure to said one compartment;
(i) an expansion chamber including pressure means for maintaining a fluid in said chamber under a pressure lower than said predetermined pressure,
  (1) said expansion chamber being outwardly spaced from said unit;
(j) means defining a second elongated conduit connecting said expansion chamber to said one compartment;
(k) valve control means in said unit and connected to said valve means, said control means being responsive to a first relative axial position of said members for opening said first conduit; and
(l) pump control means responsive to relative reciprocating movement of said members about a second relative axial position thereof for actuating said pump means.

2. A device as set forth in claim 1, wherein said expansion chamber defines a space therein and includes a pliable membrane dividing said space into two parts, one of said parts communicating with said second conduit, and said pressure means including a gas cushion in the other part, a liquid substantially filling said one part, said conduits, said unit, and a portion of said storage chamber.

3. A device as set forth in claim 1, wherein a portion of said piston rod member projects axially from said cylinder member, said conduits entering said unit through the projecting portion of said piston rod member.

4. A device as set forth in claim 1, said piston rod member defining a bore therein, and said pump means including a cylinder part and a piston part received in said cylinder part, said parts being respectively connected to said members for joint movement, said cylinder part extending within said bore and dividing the same into two axially elongated spaces, one of said spaces being a portion of one of said conduits.

5. A device as set forth in claim 4, wherein said piston part is tubular and encloses a portion of the other conduit.

6. A device as set forth in claim 1, wherein said piston rod member is hollow, and said pump means, said valve control means, and said pump control means are arranged within said piston rod member.

7. A device as set forth in claim 1, wherein said piston rod member is hollow, said pump means including a first elongated tubular member fixedly and coaxially fastened in said piston rod member, a second elongated tubular member fixedly and coaxially fastened to said cylinder member in said cavity thereof, a piston part mounted on said first tubular member and slidably received in said second tubular member and valve means in said piston part for opening and closing a passage extending axially through the piston part.

8. A device as set forth in claim 1, wherein said piston rod member is hollow, said pump means including a tubular member fixedly and coaxially fastened in said piston rod member, and a piston part mounted on said cylinder member and received in said tubular member, said piston part being hollow and formed with an axial orifice, a portion of said first conduit extending through said piston part and said orifice, said valve means including a first valve member movable relative to said orifice between an open and closed position, and a second valve member arranged in said first conduit and mounted on said piston rod member.

9. A device as set forth in claim 1, wherein said pump means include a piston part and a cylinder part, said parts being respectively mounted on said piston rod member and on said cylinder member for axial movement with the associated member relative to the other part, said piston part being tubular, and the bore thereof constituting a portion of said first conduit, said valve means including a valve member mounted on said piston part, and said valve control means including resilient abutment means mounted on the member associated with said cylinder part for engagment with said valve member and for thereby opening said first conduit.

References Cited

UNITED STATES PATENTS 3,353,815  11/1967  Henry-Biabaud _____ 267—64

ARTHUR L. LA POINT, *Primary Examiner.*

R. M. WOHLFARTH, *Assistant Examiner.*